US008510287B1

(12) United States Patent
Wu et al.

(10) Patent No.: US 8,510,287 B1
(45) Date of Patent: Aug. 13, 2013

(54) ANNOTATING PERSONALIZED RECOMMENDATIONS

(75) Inventors: Qiang Wu, Sammamish, WA (US); Syed Muhammad Mujahid Hassan, Bellevue, WA (US); Jiayuan Huang, Sammamish, WA (US); Sadi Khan, Redmond, WA (US); Yi Mao, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/532,194

(22) Filed: Jun. 25, 2012

Related U.S. Application Data

(60) Provisional application No. 61/621,566, filed on Apr. 8, 2012.

(51) Int. Cl.
*G06F 7/00* (2006.01)
*G06F 17/30* (2006.01)

(52) U.S. Cl.
CPC . *G06F 7/00* (2013.01); *G06F 17/30* (2013.01)
USPC ............ 707/706; 707/722; 707/732; 707/758

(58) Field of Classification Search
None
See application file for complete search history.

(56) References Cited

U.S. PATENT DOCUMENTS

| | | | |
|---|---|---|---|
| 2008/0235283 A1 | 9/2008 | Turnball et al. | |
| 2009/0019028 A1* | 1/2009 | Norris et al. | 707/5 |
| 2009/0043725 A1* | 2/2009 | Gutta | 706/54 |
| 2009/0112989 A1 | 4/2009 | Anderson et al. | |
| 2010/0262518 A1* | 10/2010 | Hillis et al. | 705/27 |
| 2011/0035350 A1 | 2/2011 | Zwol et al. | |
| 2011/0153663 A1 | 6/2011 | Koren et al. | |
| 2011/0179081 A1 | 7/2011 | Ovsjanikov et al. | |
| 2011/0208711 A1 | 8/2011 | Van Vleet et al. | |
| 2011/0241882 A1* | 10/2011 | Gonzales et al. | 340/572.1 |
| 2012/0296886 A1* | 11/2012 | Hillis et al. | 707/706 |

OTHER PUBLICATIONS

Shevade, et al., "A Collaborative Annotation Framework", Retrieved at <<https://www0.comp.nus.edu.sg/~kanmy/dossier/papers/ame-tr-2005-04.pdf>> IEEE International Conference on Multimedia and Expo, Jul. 6, 2005, pp. 1346-1349.
Gemmell, et al., "Personalized Recommendation by Example in Social Annotation Systems", Retrieved at <<http://www.dcs.warwick.ac.uk/~ssanand/RSWeb11/10Gemmell.pdf>> Proceedings: RSWeb'11, Oct. 23, 2011, pp. 8.

* cited by examiner

*Primary Examiner* — Jay Morrison
(74) *Attorney, Agent, or Firm* — Tracy S Powell; Powell IP Law, PLLC

(57) ABSTRACT

An annotation system that provides annotations for a corresponding set of entities with regard to a user is presented. The annotation system annotates the entities independently of the selection of the entities to be annotated. Upon receiving a set of entities to annotate, the annotation system identifies a set of annotation relationships between the user and the entity. Each annotation relationship identifies a reason or basis for which the entity may be relevant to the user. The annotation relationships are scored to identify the strength of the relationship between the user and the entity. A configurable threshold number of annotation relationships with the greatest affinity between the user and the entity are selected as the annotation for the entity.

13 Claims, 9 Drawing Sheets

FIG. 2

ANNOTATING PERSONALIZED RECOMMENDATIONS

BACKGROUND

More and more, people are interacting with and through online services, including but not limited to social networking sites, search engines, online shopping sites, libraries, entertainment/gaming sites, music and video streaming sites, and the like. All of these online services work at a basic level of functionality with each new (or unidentified) user, yet nearly all of these online services work "better" when a user provides information about himself/herself to the service. With specific information about the user, these online services are able to "personalize" their services—i.e., provide services specifically tailored and targeted to the user. Frequently these online services also "share" information regarding their users in order to expand their knowledge of each of "their" users.

As part of personalizing the service to a user, these online services will often make recommendations to the user of a product, a service, available content, and the like. For example, a social networking site may recommend people or groups with whom you may wish to associate. A search engine may recommend content, entities, and/or alternative search queries. Similarly, a video streaming service may recommend one or more videos it believes that may interest the user. Sometimes a user will understand the basis of a recommendation from a search service. However, quite often the user cannot understand the basis of a recommendation, i.e., the relationship between the user and a personalized or recommended item. When this occurs, the user is understandably suspicious of the item and why it was presented, and directly impacts the user engagement of a recommendation.

SUMMARY

The following presents a simplified summary in order to provide a basic understanding of various embodiments described herein. This summary is not an extensive overview, and it is not intended to identify key and/or critical elements or to delineate the scope thereof. The sole purpose of this summary is to present some concepts in a simplified form as a prelude to the more detailed description that follows.

According to aspects of the disclosed subject matter, a computer-implemented method for responding to a search query (or other search-triggering event) with search results information that includes annotated entities is provided. A set of search results information is obtained from a search results retrieval component. From the search results information a set of recommended entities is identified. An annotation is obtained for each of the recommended entities from an annotation component. A search results page is generated that includes a portion of the search results information. The portion of the search results information further includes at least one of the recommended entities. A user-actionable indicator is placed next to each recommended entity included in the search results page. The user-actionable indicators are configured to provide the annotation corresponding to the recommended entity.

According to additional embodiments of the disclosed subject matter, a computer-readable medium bearing computer-executable instructions is presented. When the computer-executable instructions are executed on a computer system having at least a processor and a memory, they carry out a method for responding to a search event with annotated entities. The method comprises the following, including obtaining a set of search results information from a search results retrieval component responsive to receiving notice of a search event. A plurality of recommended entities within the search results information is identified and a corresponding plurality of annotations corresponding to each of the plurality of recommended entities from an annotation component is obtained. A search results page is subsequently generated, wherein the generated search results page includes a portion of the search results information including at least one of the recommended entities. For each of the recommended entities in the search results page, a user-actionable indicator is placed proximate to the recommended entity. The user-actionable indicator is configured to provide the annotation corresponding to the recommended entity.

In accordance with still further aspects of the disclosed subject matter, an annotation system that provides a plurality of annotations for a corresponding set of entities with regard to a user is presented. In addition to a processor and a memory, the system further comprises a communication component that receives a plurality of entities to annotate and the identity of a user and that provides the annotations responsive to receiving the plurality of entities. The system also comprises an annotation store, the annotation store storing relationship information regarding a plurality of entities and the user. Still further, the system comprises an annotation component that, for each entity of the set entities, provides an annotation for the entity based on the relationship information in the annotation store.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein:

FIG. 2 is a pictorial diagram of an exemplary browser view showing annotated recommended entities in accordance with aspects of the disclosed subject matter;

DETAILED DESCRIPTION

Figure 1:
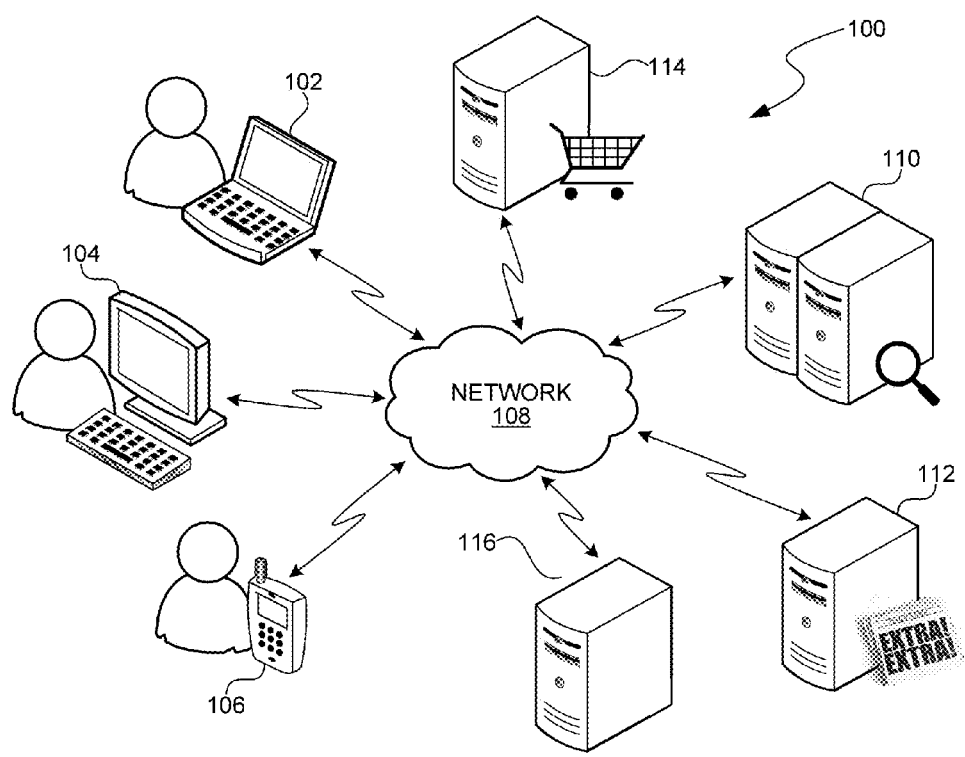
FIG. 1 is a diagram illustrating an exemplary networked environment suitable for implementing aspects of the disclosed subject matter.

For purposed of clarity, the use of the term "exemplary" in this document should be interpreted as serving as an illustration or example of something, and it should not be interpreted as an ideal and/or leading illustration of that thing.

As used in this document, the term "entity" refers to a concept, a person, or a thing. An entity is a "something" which can be annotated. For example, a user will submit a search query including one or more query terms, and these query terms relate to one or more entities—i.e., the intent of the search query. For example, a search query "Paris, France" relates to a single entity, the capital city in France. Search queries may specify multiple entities. For example, the search query "Paris France Eiffel Tower" may be reduced to two entities: (1) the capital of France and (2) the "Eiffel Tower." A "recommended entity" refers to an entity that has been recommended (typically through personalization) to the user. In the context of a search engine, a recommended entity may include, but is not limited to, a search result (that references suggested content), a suggested search query, a product, an advertisement, and the like. A recommended entity may also comprise a group (or set) of entities and/or a category or subcategory of a product (e.g., "shirts" or "yellow" shirts). For example, a video streaming service may recommend a collection of videos within a genre to the user, the collection being a single recommended entity.

The term, "annotation," as used throughout this document, refers to a set of relationships between an entity and a user, i.e., the rationale or basis as to how and/or why an entity relates or is relevant to the user. An annotation is comprised of one or more annotation relationships, each relationship describing a single basis for which the user and entity are related. While annotation relationships typically describe a positive affinity between the user and the entity, an annotation relationship may describe a negative affinity between the user and the entity. "Annotating an entity" identifying and associating an annotation with an entity. To visually indicate that an entity has been annotated, an indicator (typically a user-actionable indicator, such as an icon or a hyperlink) is placed in proximity to the entity through which the user can view/access the annotation for that entity. As an alternative to user-actionable indicators, the entire textual annotation may be placed next to the annotated entity.

According to aspects of the disclosed subject matter, an annotation system is present that is configured to annotate one or more entities with regard to a particular user. The annotation system provides an annotation service in which the annotation service receives a set of one or more entities along with the identity of a user and provides annotations from each of the one or more entities.

Advantageously, the annotation system identifies or determines the annotation for an entity independent of their selection or recommendation by another service. In this sense, then, the annotation system is a pluggable system, capable of working with any number of services. This is, in part, accomplished by the fact that the annotation system maintains its own annotation store and annotation analysis engine. With its annotation store and analysis engine, the annotation service issues an annotation independent of the basis by which a cooperating system identifies or recommends the set of entities. For example, a video streaming service may identify a set of videos that it (the video streaming service) wishes to recommend to the user. In annotating the set of videos (either as a group of entities or individually) the annotation system relies upon the information in the annotation store and analysis engine to identify and/or determine the corresponding annotations.

The annotation store includes information (attributes, categories, preferences, relationships, metadata, etc.) about entities, users, and relationships between the two. In conjunction with the information in the annotation store, the annotation service identifies and/or determines a set of annotation relationships between a given entity and user. According to one embodiment annotation relationships between an entity and a user are determined according to probability density functions that predict the likelihood of relevance between the user and the entity.

Clearly, one of the advantages of annotating entities independent of the service that identifies them for annotation is that the cooperative service does not need to gather, ingest, and maintain the robust information that the independent annotation system keeps and uses in annotating entities. In the example above of the video streaming service, the video streaming service may not have access to the identified user's browsing history, the user's purchase history of videos, the user's social network, or any other number of interesting details regarding the user. However, information gathered from these and other sources may be the best rationale of one or more annotation relationships between the entity and the user. Thus, the video streaming service can focus its efforts on providing video streaming services.

While the annotation system may be implemented as a cooperative, stand-alone system, in accordance with aspects of the disclosed subject matter the annotation system may be incorporated within another service. For example, a search engine may be configured to comprise an annotation system such as will be discussed in regard to FIG. 8. However, even when incorporated into another system, the annotation system determines the annotations for a set of entities independent of the process by which the entities were identified or recommended.

Much of the following discussion regarding annotating entities is made in regard to responding to a search query from a computer user. While this is one embodiment in which aspects of the disclosed subject matter may provide annotated recommendations to a user, it should be appreciated that the disclosed subject matter is not so limited. Indeed, there are various conditions that may trigger a search event. User-initiated search queries are search events. Proximity-based apps, such as an app on the user's mobile device for finding restaurants in the device's immediate vicinity, will trigger a search event that obtains search results for the corresponding computer/device user. Recognition services may also cause a search event. For example, a recognition app running on a user's mobile device may initiate a search event to provide information regarding a location or person as the user takes a picture with the mobile device. Accordingly, while much of the discussion that follows is made in regard to responding to a search query from a computer user, it is just one example of a search-triggering event ("search event") and should not be viewed as limiting upon the disclosed subject matter.

Turning now to FIG. 1, this figure shows is a diagram illustrating an exemplary networked environment 100 suitable for implementing aspects of the disclosed subject matter. The illustrative environment 100 includes one or more user computers, such as user computers 102-106, connected to a network 108, such as the Internet, a wide area network or WAN, and the like. Also connected to the network 108 is a search engine 110. Those skilled in the art will appreciate that a search engine 110 corresponds to an online service hosted on one or more computers on, or computing systems distributed throughout, the network 108. The search engine 110 receives and responds to search queries submitted over the network 108 from various users, such as the users connected to user computers 102-106. In response to receiving a search query, the search engine 110 obtains search results information related and/or relevant to the received search query (as defined by the terms of search query.) The search results information includes search results, i.e., references (typically in the form of hyperlinks) to relevant/related content available from various target sites (such as target sites 112-114) on the network 108. The search results information may also include other information such as related and/or recommended alternative search queries, data and facts regarding the subject matter of the search query, products and/or services related/relevant to the search query, advertisements, and the like. The search engine 110 generates one or more search results pages responsive to the search query based on the search results information. According to various embodiments of the disclosed subject matter, the search engine 110 includes annotated entities with the generated search results pages.

Also shown in the exemplary networked environment 100 is an annotation system 116 for annotating entities, including personalized entities from a search engine 110. While this annotation system 116 is shown as being a separate service/entity in the networked environment 100, it should be appreciated that this is illustrative only and should not be construed as limiting upon the disclosed subject matter. The process of the annotation system in annotating an entity is described in greater detail below.

As those skilled in the art will appreciate, target sites, such as target sites 112-114, host content that is available and/or accessible to users (via user computers) over the network 108. The search engine 110 will be aware of at least some of the content hosted on the many target sites located throughout the network 108, and will store information regarding the hosted content of the target sites in a content index (620 of FIG. 7). The search engine 110 draws from the content index when obtaining search results information in response to receiving a search query. As shown in FIG. 1, the target sites include, by way of illustration, a news organization 112, and a shopping site 114. Of course, those skilled in the art will appreciate that any number and type of target sites may be connected to the network 108. Moreover, as is known in the art, some search engines are aware of millions of target sites and the content that is hosted by those target sites.

Suitable user computers for operating within the illustrative environment 100 include any number of computing devices that can communicate with the search engine 110 or target sites 112-114 over the network 108. In regard to the search engine 110, communication between the user computers 102-106 and the search engine 110 include both submitting search queries and receiving a response in the form of one or more search results pages from the search engine 110. User computers 102-106 may communicate with the network 108 via wired or wireless communication connections. These user computers 102-106 may comprise, but are not limited to: laptop computers such as user computer 102; desktop computers such as user computer 104; mobile phone devices such as user computer 106; tablet computers (not shown); on-board computing systems such as those found in vehicles (not shown); mini- and/or main-frame computers (not shown); and the like.

Figure 2:
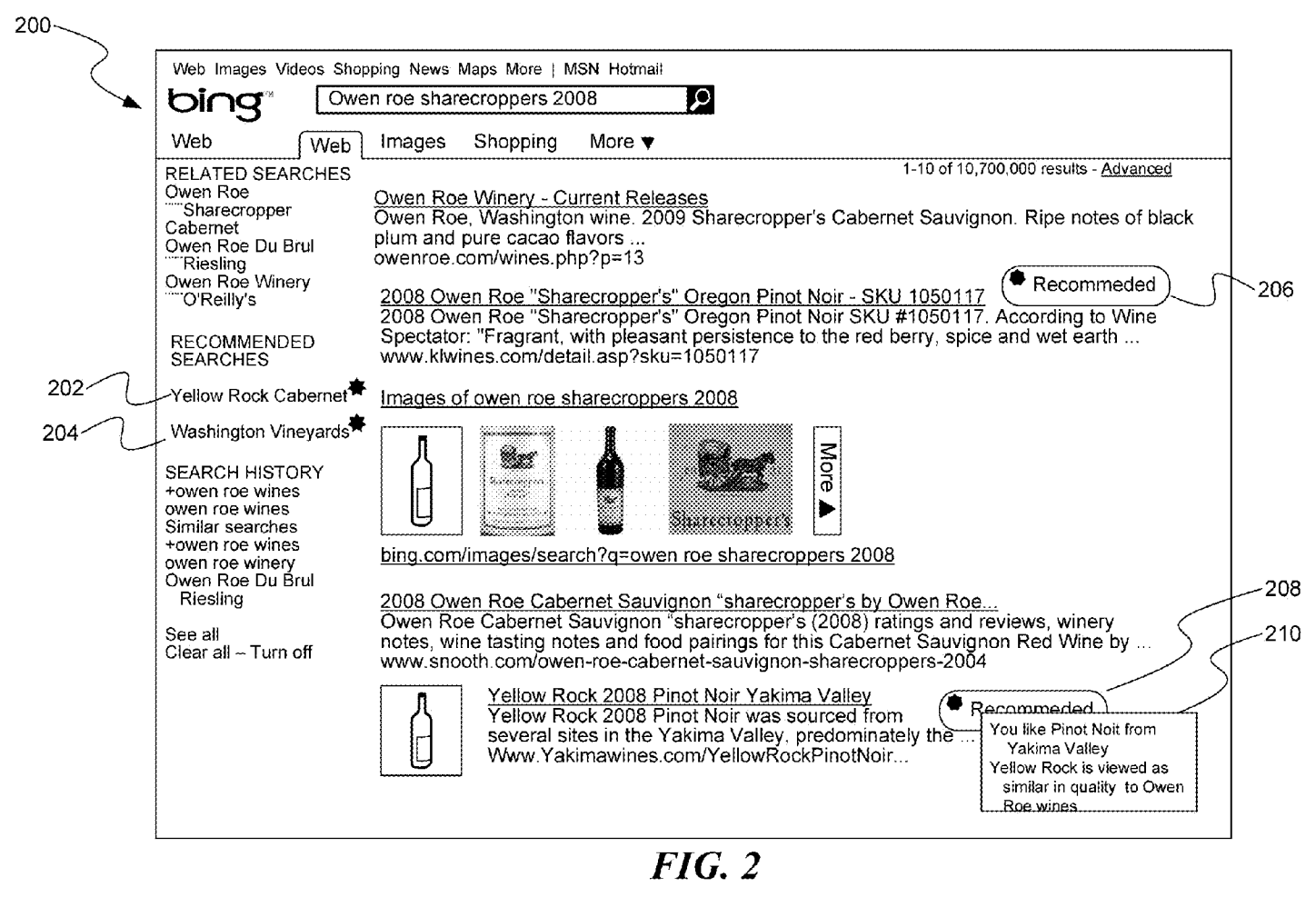

Turning now to FIG. 2, this figure is a pictorial diagram of an exemplary browser view 200 showing annotated recommended entities within the browser view in accordance with aspects of the disclosed subject matter. In this example, a user has submitted the search query, "Owen Roe Sharecroppers 2008", and browser view 200 illustrates a portion of a generated search results page that includes search results information, including recommended entities. More particularly, the recommended entities include recommended queries 202-204, a recommended search result 206, and a recommended product group 208. As can be seen, each of these recommended entities is annotated with an indicator through which the user can view the rationale for which each entity may have been recommended to the user. For example, a user-actionable icon 210 is placed next to entity group 208 indicating that the entity has been annotated. Annotation view 212 illustrates exemplary annotation relationships between the user who submitted the query and the recommended entity (i.e., the group of wines.) In regard to the annotation information, according to aspects of the disclosed subject matter, for each annotation there may be one or more annotation relationships identified between the user and the entity.

Figure 3:
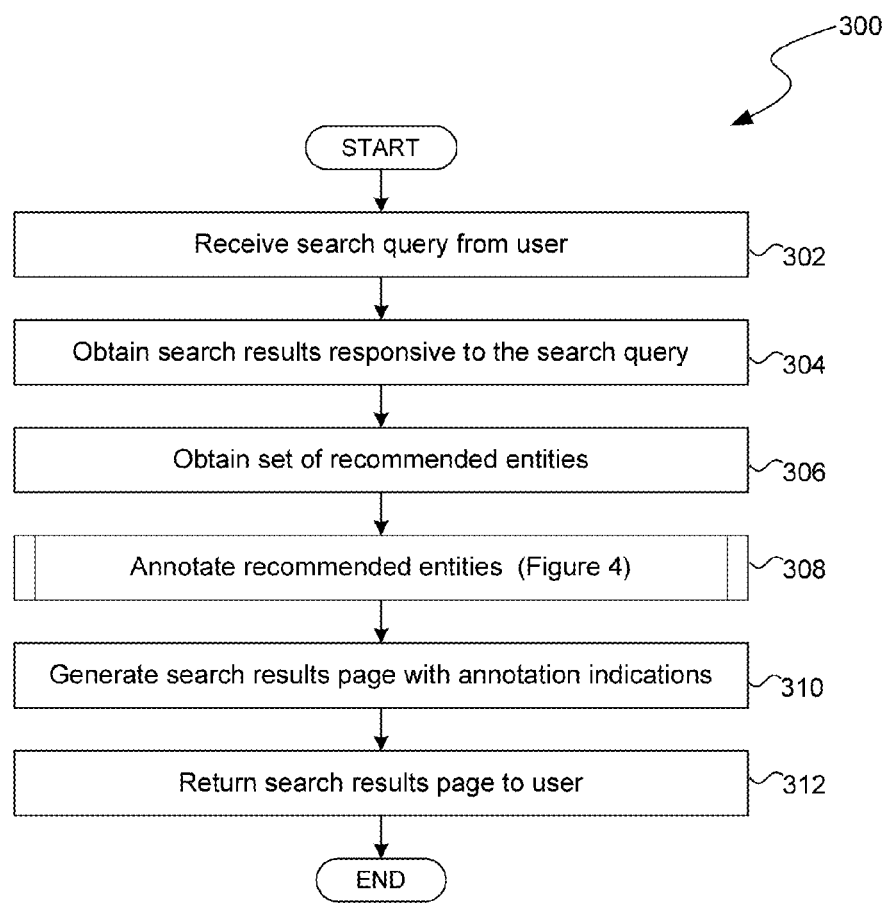
FIG. 3 is a flow diagram illustrating an exemplary routine suitable for annotating recommended entities on a search results page.

To better understand the process by which entities within a search results page are annotated, reference is now made to FIG. 3. FIG. 3 is a flow diagram illustrating an exemplary routine 300 suitable for annotating recommended entities on a search results page. Beginning at block 302, the search engine 110 receives a search query from a user. At block 304, the search engine 110 obtains search results information responsive to the search query. The search results information includes search results relevant to the search query, i.e., references (typically hyperlinks) to content stored throughout the network 108. Further, however, the search results information will typically include, without limitation, data related to the search query, images, videos, alternative related search queries, search histories, recommended search queries (such as recommended search queries 202-204), related products, and the like.

At block 306, an annotation system associated with the search engine 110 (or incorporated as a part of the search engine) obtains a set of recommended entities from the search results information that was obtained in response to the search query from the user. Once a set of recommended entities is identified, at block 308 those recommended entities are annotated, i.e., annotation information for each recommended entity is obtained. Obtaining annotation information for the recommended entities is described in regard to FIG. 4.

Figure 4:
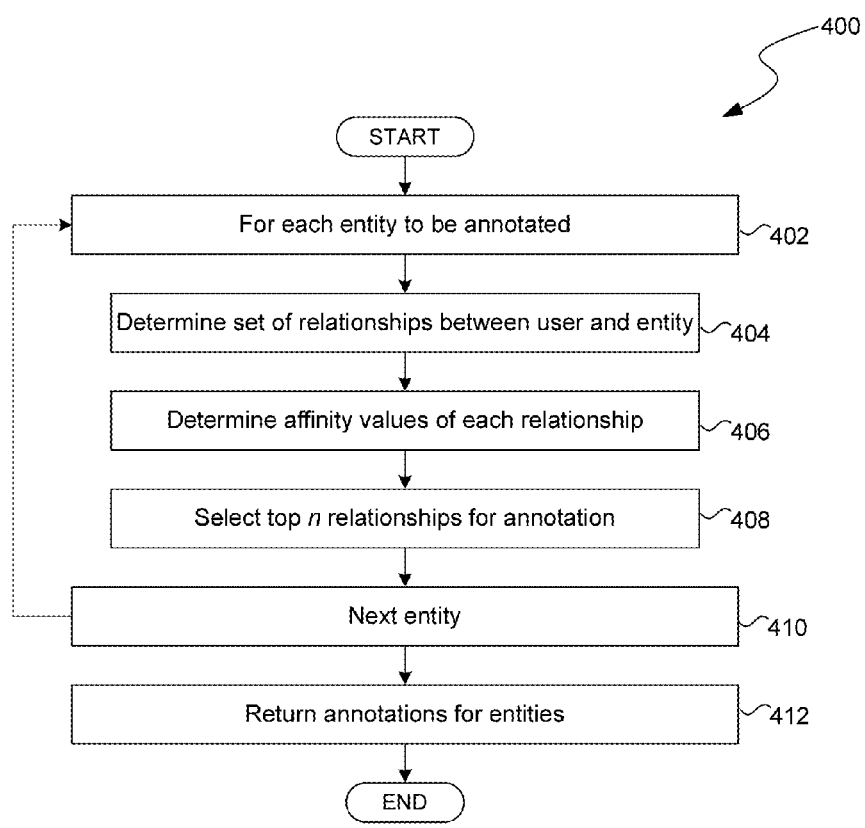
FIG. 4 is a flow diagram illustrating an exemplary subroutine for determining annotations between a set of entities and a user.

Turning, then, to FIG. 4, this figure is a flow diagram illustrating an exemplary sub-routine 400 for determining annotations between a set of entities and a user. Beginning at block 402, a looping construct is begun to iterate through the set of entities that are to be annotated, such that the steps of blocks 404-408 are repeated for each entity. At block 404, the annotation system determines a set of annotation relationships according to information in a relationship store between the user and the current entity being processed. These relationships are often of a positive nature but may also be a negative relationship (i.e., "product A is recommended because you don't like product B" or "your friend Joe did not like Restaurant X so we do not recommend it to you"). According to various aspects of the disclosed subject matter, the annotation system may determine/identify any number of relationships between the user and the entity, even more than can be reasonably displayed in any one annotation. In limiting the number of annotation relationships that can be used an effort is made to select those relationships that are the strongest, presumptively the most meaningful to the user. Thus, at block 406 an affinity value is assigned to each of the annotation relationships identified between the user and the entity. At block 408, the top n annotation relationships, as determined according to the affinity value between user and the entity, are selected. In this, n is a configurable number as determined according to implementation details, and may be a static or dynamic value.

At block 410, if there are any remaining entities in the set of entities to be annotated the subroutine 400 selects the next entity and returns to block 402 to process that entity. Alternatively, if all of the entities have been annotated, the subroutine 400 proceeds to block 412 where the annotations corresponding to the set of entities is returned.

Returning again to FIG. 3, once the recommended entities are annotated (i.e., are associated with an annotation describing one or more relationships between the user and the entity), the routine 300 proceeds to block 310. At block 310, the search engine 110 generates a search results page. According to aspects of the disclosed subject matter, as part of generating the search results page, the annotated entities are so indicated by an annotation indicator. In general, the annotation indicator is a user-actionable indication that is configured to display the annotation to the user upon its activation. User-actionable icon 210 (FIG. 2) is a non-limiting example of an annotation indicator. After generating the search results page, at block 312 the generated page is returned to the user (in response to the search query) and the routine 300 terminates.

Regarding the routines of FIGS. 3 and 4, (as well as other routines described below) it should be appreciated that while they are expressed with discrete steps, these steps should be viewed as being logical in nature and may or may not correspond to any actual, discrete steps. Nor should the order that these steps are presented be construed as the only order in which the various steps may be carried out. Those skilled in the art will appreciate that logical steps may be combined together or be comprised of multiple steps. Further, while novel aspects of the disclosed subject matter are expressed in routines or methods, this functionality may also be embodied in computer-readable media. As those skilled in the art will appreciate, computer-readable media can host computer-executable instructions for later retrieval and execution. When executed on a computing device, the computer-executable instructions carry out various steps or methods. Examples of computer-readable media include, but are not limited to: optical storage media such as digital video discs (DVDs) and compact discs (CDs); magnetic storage media including hard disk drives, floppy disks, magnetic tape, and the like; transitory and non-transitory memory such as random access memory (RAM), read-only memory (ROM), memory cards, thumb drives, and the like; cloud storage (i.e., an online storage service); and the like. For purposes of this document, however, computer-readable media expressly excludes carrier waves and propagated signals.

Figure 5:
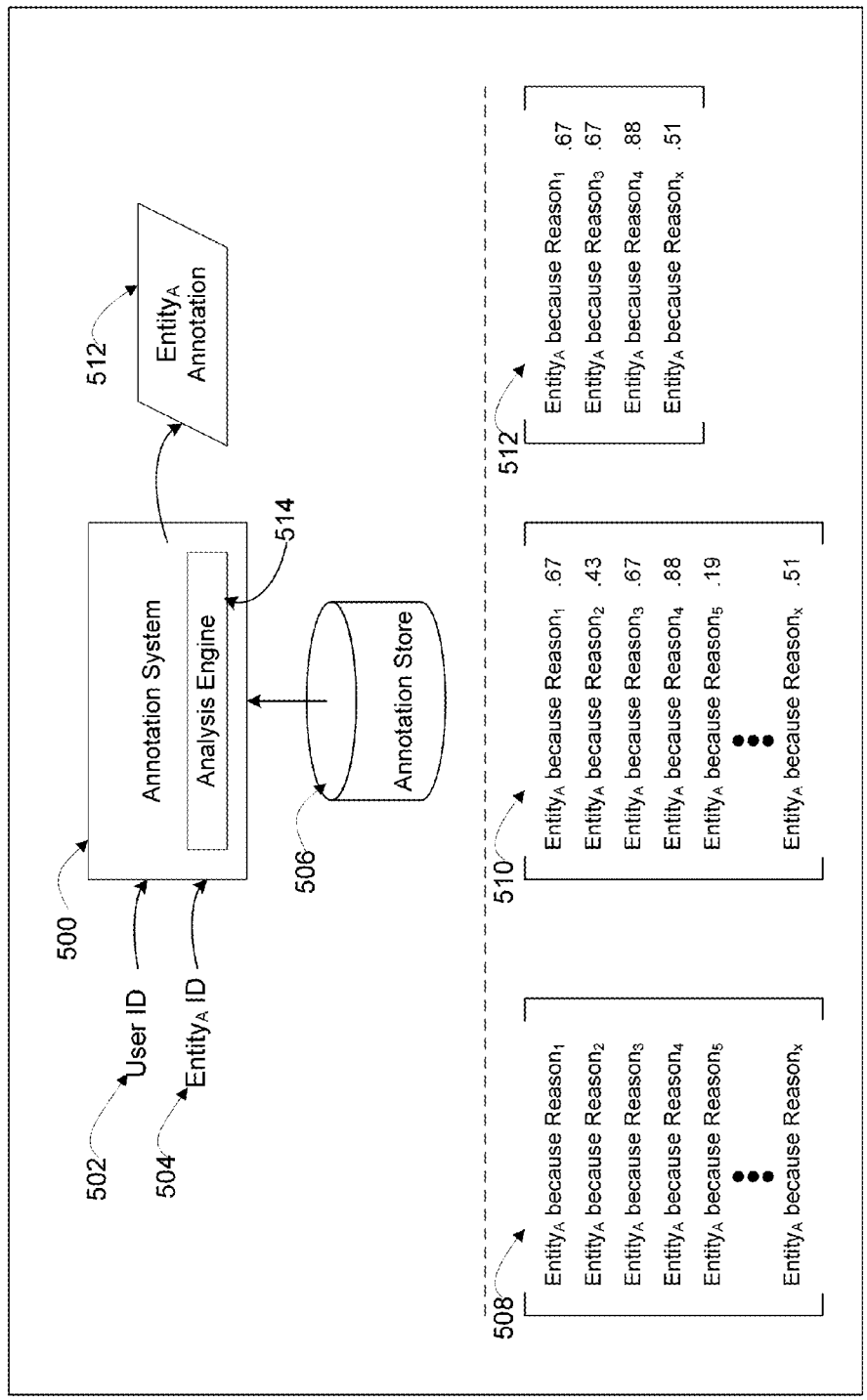
FIG. 5 is a block diagram visually illustrating the annotation of an entity.

In regard to the process by which the annotation system identifies annotations for entities, FIG. 5 is a block diagram visually illustrating the annotation of an entity. As shown in FIG. 5, the top portion of the diagram shows an annotation system 500 that accepts a user identifier 502 as one input to the annotation system and an entity identifier 504 ("Entity$_A$ ID") as a second input. It should be appreciated that while a single entity (via its identifier) is input into the annotation system 500, this is illustrative only. As discussed above, in an alternative embodiment a group of entities may be submitted to the annotation system 500 for annotation of the group.

Also shown is an annotation store 506 from which the annotation system 500 obtains information regarding the relationships between the entity (as represented by entity identifier 504) and the user (as represented by the user identifier 502). The annotation system 500 obtains the relationship information by way of an analysis engine 514, which analyzes the information from the annotation store (as well as other sources of information) and determines/identifies the various annotation relationships between the user and an entity. The output of the annotation service 500 is the entity annotation 512.

With reference to the lower portion of the diagram, the annotation service obtains a first set 508 of annotation reasons that describe one or more bases for a relationship between the entity and the user—as described in block 404 of FIG. 4. This initial set of annotation relationships is then scored, as shown in the second set 510 of annotation relationships. Generally speaking, these scores represent the strength of affinity between the entity and the user that the annotation relationship represents. In this example, those scores that are the greatest represent the most affinity, but this is illustrative and should not be viewed as limiting on the disclosed subject matter. The third set 512 of annotation relationships represents a selected subset of the annotation relationships of the earlier sets, with these restricted to the n highest scoring relationships, where n=4 (n being a predetermined threshold value). Of course this is illustrative but shows that not all possible annotation relationships need to be included in an annotation.

Regarding the selection of the best (or highest scoring) annotation relationships, while this illustrative diagram shows that the annotation system 500 is responsible for selecting a subset of the best relationships, in an alternative embodiment the annotation system returns all of the identified relationships, along with the affinity scores, such that the requesting service can make the selection itself.

As suggested above, a search engine 110 may be configured with an annotation system (or annotation component) in annotating recommended entities from among search results information. However, the annotation system is not constrained to operate solely as a component of the search engine and, in many cases, operates as an independent service with regard to other online services. Indeed, according to aspects of the disclosed subject matter the annotation system may be implemented as a "pluggable" system that can work (as an independent system) with any number of other systems or services. Examples of this include, but are limited to: associating the annotation system with a video streaming service in which the annotation system annotates video content that the video streaming search recommends to a user; an on-line book store in annotating recommended titles; a social network site in annotating friend and group recommendations; an app or music marketplace; image annotation as described in conjunction with FIGS. 6A-6B and 7; and the like. Annotations may also be made as changes in the current environment occur. For example, the annotation system may annotate offers from local merchants that are periodically sent to subscribers.

Figure 6A:
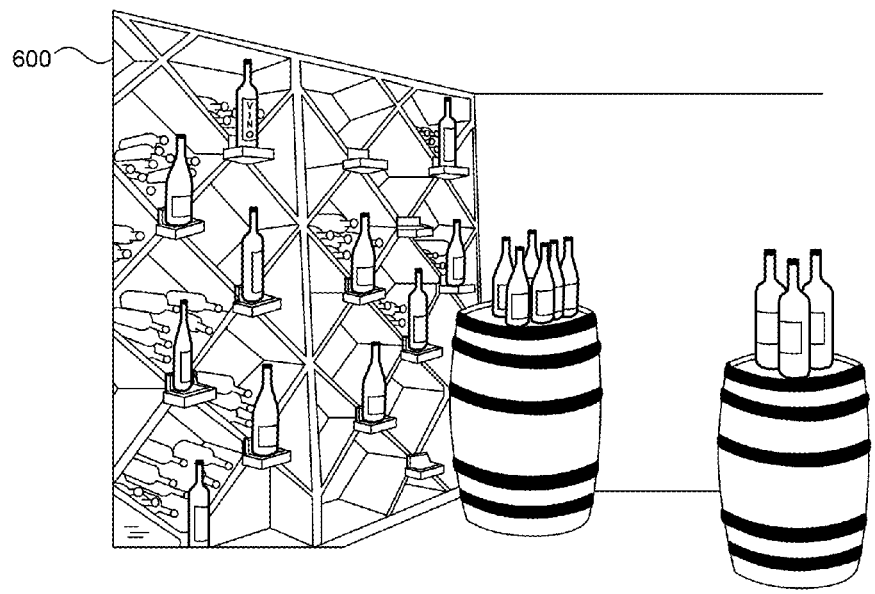
FIGS. 6A and 6B show pictorial diagrams for illustrating annotating entities with regard to an image.
Figure 6B:
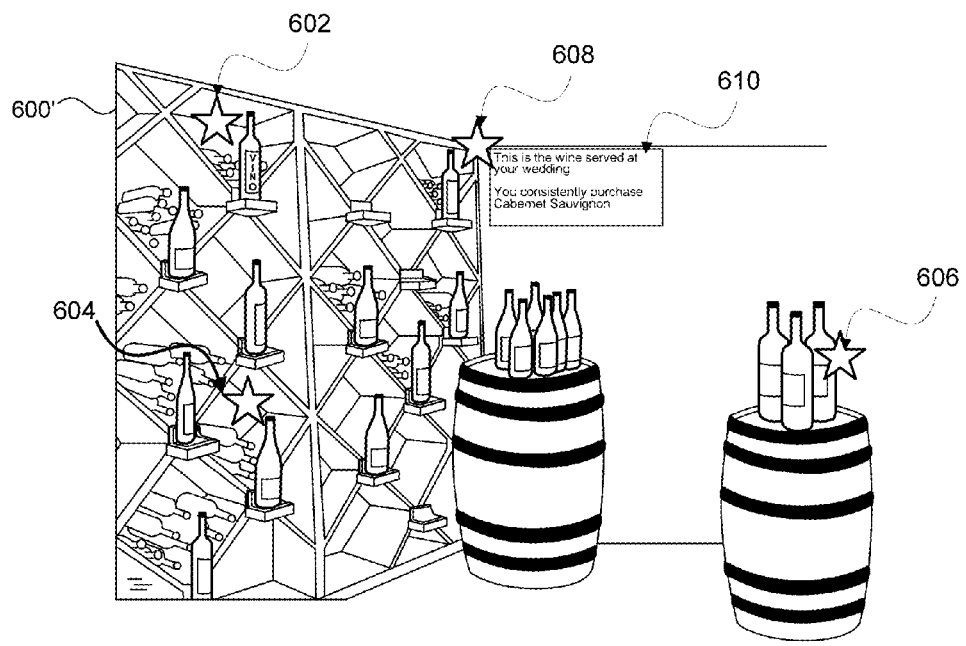

In regard to FIGS. 6A and 6B, these two figures show pictorial diagrams for illustrating annotating entities with regard to an image 600. In this example, we can assume that image 600 represents an image that is taken on a user's mobile phone device (that frequently includes a camera for taking images.) A service on the user's mobile phone device (through which the image is taken) provides so-called augmented reality services. This service determines the location and image view such that the subject matter of the image 600 can be recognized. The various entities within the recognized subject matter are then identified and a portion of the entities are recommended to the user. These recommended entities are then submitted to the annotation system (operating as a pluggable service to the augmented reality service, to annotate the recommended entities. An exemplary routine for annotating an image is discussed in regard to routine 700 of FIG. 7. As shown in FIG. 6B, the recommended entities annotated, the augmented reality service overlays the image 600' with user actionable icons 602 608. Assuming that a user activated icon 602, an annotation window 610 is presented showing one or more annotation relationships between the user and the entity identified in the image 600.

Figure 7:
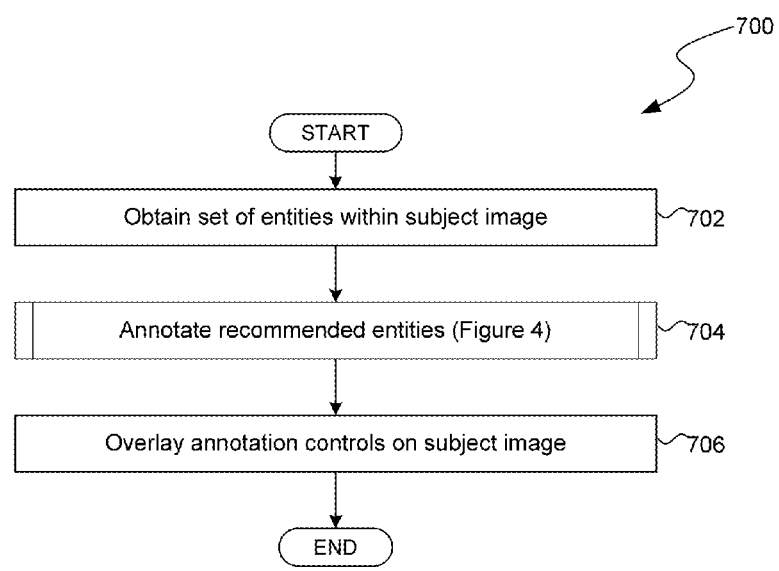
FIG. 7 is a flow diagram illustrating an exemplary routine suitable for annotating entities within an image.

Turning to FIG. 7, this figure is a flow diagram illustrating an exemplary routine 700 suitable for annotating entities within an image, such as the image 600 of FIGS. 6A and 6B. Beginning at block 702, the pluggable annotation system (i.e., an annotation system that operates autonomously or semi-autonomously from other systems) obtains a set of entities within the image that are to be annotated. At block 704, the sub-routine 400 (FIG. 4) is called to annotate the various entities. Thereafter, at block 706, annotation controls (i.e., user-actionable indicators) are overlaid in the image such that the user can interact and discover one or more rationale as to why the corresponding entity is recommended to the user.

Figure 8:
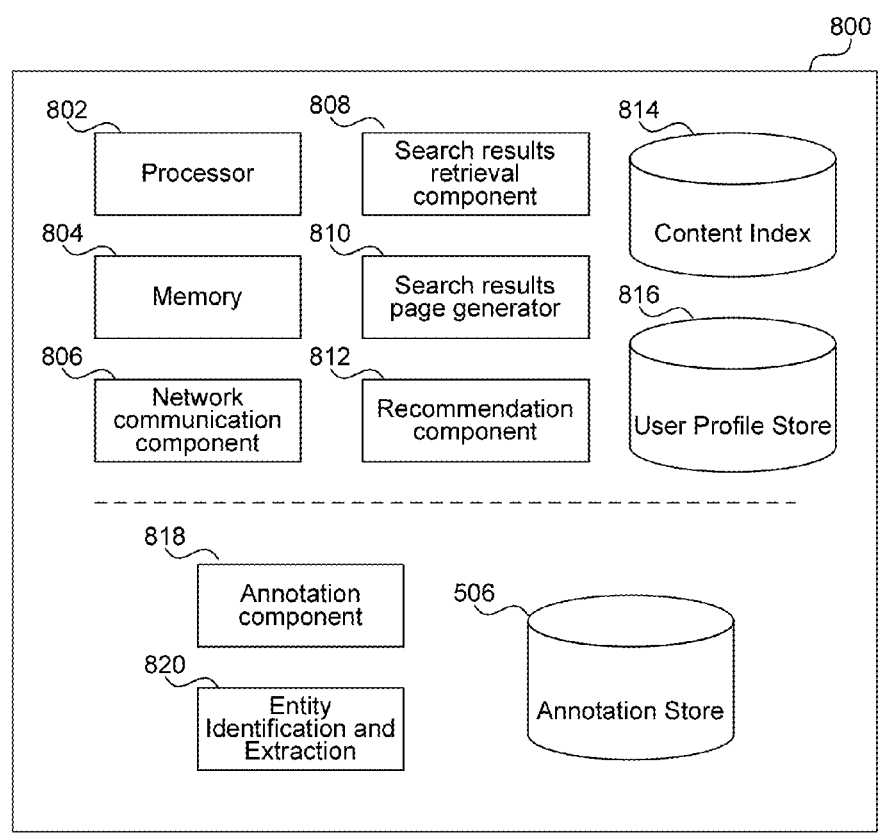
FIG. 8 is a block diagram illustrating exemplary components of a search engine configured to respond to search queries with a search results page including annotated entities.

FIG. 8 is a block diagram illustrating exemplary components of a search engine 110 configured with an annotation system (as suggested earlier) to respond to search queries with a search results page that includes annotated entities. The search engine 110 includes a processor 802 and a memory 804. As those skilled in the art will appreciate, the processor 802 executes instructions retrieved from memory 804 in carrying out various aspects of the search service, including annotating recommended entities within the search results information.

The search engine 110 also includes a network communications component 806 through which the search engine sends and receives communications over the network 108. For example, it is through the network communication component 806 that the search engine 110 receives search queries from user computers, such as user computers 102-106, and returns results responsive to the search queries. The search engine 110 further includes a search results retrieval component 808 and a search results page generation component 810. Regarding the search results retrieval component 808, this logical component is responsible for retrieving or obtaining search results information relevant to a user's search query from the content index 814. Once the set of search results information responsive to a search query have been retrieved, an entity recommendation component 812 identifies various entities as recommended entities for the user. These recommendations, as well as other personalization information, are typically based on information in a user profile store 816.

It should be appreciated, of course, that many of these components should be viewed as logical components for carrying out various functions of a suitably configured search engine 110. These logical components may or may not correspond to actual components. Moreover, in an actual embodiment, these components may be combined together or broke up across multiple actual components.

Also included as part of the search engine 110 is the annotation system. More particularly, this search engine is configured with an annotation system that includes an annotation component 818 that accepts one or more recommended entities and provides an annotation for that entity (as previously described.) Also included as part of the annotation system of the search engine 110 is an annotation store 506 from which the annotation component 818 obtains/identifies the relationships between an entity and the user. In at least one embodiment, these entities are identified through an entity identification and extraction component 820. This entity identification and extraction component identifies a given set of entities with text, such as a user query. Of course, while shown as part of the annotation system portion of the search engine 110, in one embodiment the entity identification and extraction component may be an external component to the search engine.

Figure 9:
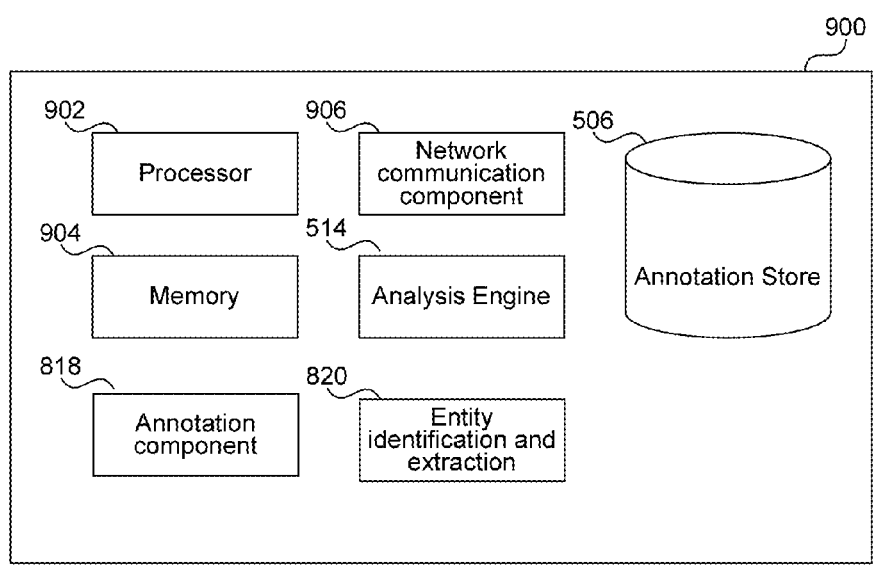
FIG. 9 is a block diagram illustrating exemplary components of an annotation system suitable for annotating a plurality of entities according to aspects of the disclosed subject matter.

While the annotation system of FIG. 8 is shown as being a part of the search engine 110, as already mentioned, in an alternative embodiment the annotation system can be implemented as an autonomous or semi-autonomous system. FIG. 9 is a block diagram illustrating exemplary components of an annotation system 900 suitable for annotating a plurality of entities according to aspects of the disclosed subject matter. This exemplary annotation system includes a processor 902 and a memory 904 implementing similar functionality as described above in regard to FIG. 8. The annotation system 900 further includes a network communication component 906 through which the annotation system communicates with other systems in carrying out its annotation function. Also included is an annotation component 818 that accepts one or more entities and provides an annotation for each entity (as previously described in regard to FIG. 8). Still further included as part of the annotation system 900 is an annotation store 506 from which the analysis engine 514 obtains/identifies the relationships between an entity and the user. The entity identification and extraction component, if not included as part of the annotation component 818, identifies a given set of entities from natural language text.

Regarding the various components identified in FIGS. 8 and 9, while certain components are identified as parts of the various computing systems, it should be appreciated that these components should be viewed as logical components for carrying out various functions of suitable configured search engine 110. These logical components may or may not correspond directly to actual components. Moreover, in an actual embodiment, these components may be combined together or broke up across multiple actual components.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer-implemented method for responding to a search query with information including annotated entities, the method comprising:
   obtaining a set of search results information from a search results retrieval component in response to receiving a search query from a user;
   identifying a set of recommended entities from within the search results information;
   obtaining an annotation for each of the recommended entities from an annotation component and assigning an affinity value to each of the annotations, the annotation component being distinct from the search results retrieval component, wherein each annotation for each recommended entity comprises a set of annotation relationships between the user and the recommended entity, each annotation relationship describing a basis for which the recommended entity is relevant to the user, and wherein the affinity values between the user and a recommended entity are determined according to one or more probability density functions;
   selecting a threshold number of annotation relationships of each annotation having the highest affinity value between the user and the corresponding recommended entity;
   generating a search results page including a portion of the search results information, the portion of the search results information including at least one of the recommended entities, and placing a user actionable indicator next to each recommended entity included in the search results page, wherein each user actionable indicator is configured to provide the annotation comprising the selected threshold number of annotation relationships corresponding to the recommended entity upon activation; and returning the at least one search results page to the user responsive to the search query.

2. The method of claim 1, wherein an annotation relationship of the set of annotation relationships describes a positive affinity between the user and the recommended entity.

3. The method of claim 1, wherein an annotation relationship of the set of annotation relationships describes a negative affinity between the user and the recommended entity.

4. The method of claim 1, wherein the basis for which the recommended entity is relevant to the user comprises a social basis according to the actions of the user's social network.

5. The method of claim 1, wherein the basis for which the recommended entity is relevant to the user comprises a statistical related action basis.

6. The method of claim 1, wherein the basis for which the recommended entity is relevant to the user comprises a geographic basis according to the user's current geographic location.

7. The method of claim 1, wherein the basis for which the recommended entity is relevant to the user comprises one or more of a social basis, a related action basis, a periodic basis, a current trends basis, and a geographic basis.

8. A computer-readable medium bearing computer executable instructions which, when executed on a computer system having at least a processor and a memory, carry out a method for responding to a search query with annotated entities, comprising the method of:

obtaining a set of search results information from a search results retrieval component responsive to receiving a search query from a computer user;

identifying a plurality of recommended entities within the search results information and obtaining a corresponding plurality of annotations corresponding to each of the plurality of recommended entities from an annotation component and assigning an affinity value to each of the plurality of annotations, the annotation component being distinct from the search results retrieval component, wherein each annotation for each recommended entity comprises a set of annotation relationships between the user and the recommended entity, each annotation relationship describing a basis for which the recommended entity is relevant to the user, and wherein the affinity values between the user and a recommended entity are determined according to one or more probability density functions;

selecting a threshold number of annotation relationships of the plurality of annotations having the highest affinity value between the user and the corresponding recommended entity;

generating a search results page, wherein the generated search results page includes a portion of the search results information including at least one of the recommended entities and, for each of the recommended entities in the search results page, annotating the recommended entity by a user actionable indicator proximate to the recommended entity, wherein the user actionable indicator is configured to provide the annotation comprising the selected threshold number of annotation relationships corresponding to the recommended entity upon activation; and returning the generated search results page responsive to the search query from the user.

9. The computer-readable medium of claim 8, wherein a relationship of the set of annotation relationships describes a positive affinity between the user and the recommended entity.

10. The computer-readable medium of claim 8, wherein an annotation relationship of the set of annotation relationships describes a negative affinity between the user and the recommended entity.

11. The computer-readable medium of claim 8, wherein the basis for which the recommended entity is relevant to the user comprises any one of a social basis according to the actions of the user's social network, a statistical related action basis, and a geographic basis according to the user's current geographic location.

12. An annotation system for providing a plurality of annotations for a corresponding set of entities with regard to a user, wherein the annotation system is implemented on a computer system comprising at least a processor executing instructions stored in a memory, and further comprising:

a communication component that receives a plurality of entities to annotate and the identity of a user, and that provides annotations in response to receiving the plurality of entities;

an annotation store, the annotation store storing relationship information regarding a plurality of entities and the user;

an annotation component that, for each entity of the set entities, provides an annotation for the entity based on the relationship information in the annotation store, and further assigns an affinity value to each of the plurality of annotations, wherein the affinity values are determined according to one or more probability density functions, and wherein each annotation for each of the plurality entities comprises a set of annotation relationships between the user and the entity, each annotation relationship describing a basis for which the entity is relevant to the user; and wherein, for each entity in the set of entities, the annotation component identifies a plurality of annotation relationships between the entity and the user, and for each annotation, includes only a threshold number of relationships having the highest affinity value between the entity and the user.

13. The annotation system of claim 12, wherein the annotation system is configured to obtain a set of entities and the identity of the user, and further configured to provide the annotations corresponding to each of the entities of the set of entities or a single annotation for a group of entities.

* * * * *